(12) United States Patent
Yang

(10) Patent No.: US 10,502,904 B2
(45) Date of Patent: Dec. 10, 2019

(54) OPTICAL FIBER ADAPTER

(71) Applicant: Muh-Chen Yang, Taipei (TW)

(72) Inventor: Muh-Chen Yang, Taipei (TW)

( * ) Notice: Subject to any disclaimer, the term of this patent is extended or adjusted under 35 U.S.C. 154(b) by 0 days.

(21) Appl. No.: 16/147,156

(22) Filed: Sep. 28, 2018

(65) Prior Publication Data

US 2019/0331860 A1 Oct. 31, 2019

Related U.S. Application Data

(60) Provisional application No. 62/663,261, filed on Apr. 27, 2018.

(51) Int. Cl.
*G02B 6/38* (2006.01)
*G02B 6/42* (2006.01)

(52) U.S. Cl.
CPC ......... *G02B 6/3825* (2013.01); *G02B 6/3849* (2013.01); *G02B 2006/4297* (2013.01)

(58) Field of Classification Search
CPC .......................... G02B 6/3849; G02B 6/3825
USPC .......................................................... 385/75
See application file for complete search history.

(56) References Cited

U.S. PATENT DOCUMENTS

| | | | | |
|---|---|---|---|---|
| 5,506,922 A * | 4/1996 | Grois | ................... | G02B 6/3825 385/75 |
| 5,825,955 A * | 10/1998 | Ernst | ................... | G02B 6/3825 385/79 |
| 6,340,246 B1 * | 1/2002 | Yoshida | ............... | G02B 6/3849 385/73 |
| 6,461,054 B1 * | 10/2002 | Iwase | ................... | G02B 6/3849 385/70 |
| 6,595,696 B1 * | 7/2003 | Zellak | ................... | G02B 6/3825 385/72 |
| 6,945,705 B2 * | 9/2005 | Takeda | ................. | G02B 6/3849 385/139 |
| 7,972,066 B1 * | 7/2011 | Lin | ....................... | G02B 6/3825 385/53 |
| 9,195,013 B2 * | 11/2015 | Yoshizaki | ........... | G02B 6/3825 |
| 9,618,715 B1 * | 4/2017 | Yang | .................... | G02B 6/4296 |
| 9,671,568 B2 * | 6/2017 | Yoshizaki | ........... | G02B 6/3849 |
| 9,933,586 B1 * | 4/2018 | Yang | .................... | G02B 6/3847 |
| 2002/0081076 A1 * | 6/2002 | Lampert | .............. | G02B 6/3895 385/70 |
| 2003/0002808 A1 * | 1/2003 | Lampert | .............. | G02B 6/3825 385/70 |
| 2003/0147597 A1 * | 8/2003 | Duran | .................. | G02B 6/3825 385/76 |
| 2003/0180005 A1 * | 9/2003 | McBride | ............. | G02B 6/3825 385/73 |

(Continued)

*Primary Examiner* — Kaveh C Kianni

(57) ABSTRACT

An optical fiber adapter has a body divided into two accommodation rooms by a partition wall. Two ends of the accommodation room have a first opening and a second opening. Side walls and the partition wall of the body have opposite inner surfaces. A thickened component adjacent to the first opening is formed on the inner surface. An axial guiding portion and a first stopper are formed on the thickened component. A slot is formed on a bottom wall of the body. A second stopper is disposed on the bottom wall in front of the slot. A shutter positioning slot is disposed on a top wall of the body to fix upper movable shutters. Insert slots are formed on a fixing seat to fix lower movable shutters. The fixing seat covers the slot. This optical fiber adapter has shading, dustproof and water-repellent effects.

19 Claims, 15 Drawing Sheets

(56) References Cited

U.S. PATENT DOCUMENTS

| | | | |
|---|---|---|---|
| 2004/0033030 A1* | 2/2004 | Ohbayashi | G02B 6/4292 385/88 |
| 2004/0223701 A1* | 11/2004 | Tanaka | G02B 6/3825 385/55 |
| 2005/0286833 A1* | 12/2005 | Kramer | G02B 6/3825 385/55 |
| 2006/0204200 A1* | 9/2006 | Lampert | G02B 6/3849 385/139 |
| 2007/0047881 A1* | 3/2007 | Mizuno | G02B 6/4292 385/92 |
| 2009/0226141 A1* | 9/2009 | Lin | G02B 6/3825 385/134 |
| 2010/0054665 A1* | 3/2010 | Jones | G02B 6/3825 385/59 |
| 2011/0038581 A1* | 2/2011 | Mudd | G02B 6/3849 385/53 |
| 2012/0195555 A1* | 8/2012 | Jibiki | G02B 6/3825 385/75 |
| 2012/0321266 A1* | 12/2012 | Lin | G02B 6/3825 385/134 |
| 2013/0195405 A1* | 8/2013 | Sanders | G02B 6/3825 385/56 |
| 2015/0078710 A1* | 3/2015 | Sato | G02B 6/241 385/78 |
| 2015/0093076 A1* | 4/2015 | Tanaka | G02B 6/3849 385/59 |
| 2015/0153514 A1* | 6/2015 | Sone | G02B 6/3807 385/76 |
| 2015/0241650 A1* | 8/2015 | Travis | G02B 6/3825 385/135 |
| 2018/0149813 A1* | 5/2018 | Yang | G02B 6/262 |
| 2018/0172917 A1* | 6/2018 | Ootorii | G02B 6/32 |
| 2019/0101703 A1* | 4/2019 | Travis | G02B 6/3825 |

\* cited by examiner

OPTICAL FIBER ADAPTER

FIELD OF THE INVENTION

The present invention relates to an optical fiber adapter, and more particularly to an optical fiber adapter provided with a shutter.

BACKGROUND OF THE INVENTION

In recent years, optical fibers have been widely used as a transmission medium for signals. If two optical fibers are to be connected together, optical fiber connectors and an optical fiber adapter can be used to achieve. The optical fiber connectors are usually located at both ends of the optical fiber, and can be inserted into the openings of the optical fiber adapter. The optical fiber adapter is provided with two openings. Each of the openings is connected to an optical fiber connector respectively. In order to transmit the signals to a longer distance, the energy coupled to the optical fiber is greatly increased. When the high-intensity infrared beam is emitted from one end of the optical fiber, if the user's eyes are inadvertently exposed to the beam, it will often cause permanent damage to the vision.

U.S. Pat. No. 7,785,018 discloses an optical fiber adapter provided with a movable shutter, wherein, when the optical fiber connector is connected to the optical fiber adapter, a ferrule of the optical fiber connector does not contact the movable shutter directly. Although it has a dustproof function, it does not have a light-transmitting structure, and it is impossible for human eyes to observe whether the optical path of the optical fiber is smooth.

U.S. Pat. No. 9,618,715 discloses an optical fiber adapter provided with a shading component, wherein the elastic restoring force of the spring is used to return the shading component to the original position. Due to the limitation of the installation space of the spring, the shading component abuts against the ferrule of the inner housing, and the space between the opening of the optical fiber adapter and the shading component is not sealed by the shading component, so the dustproof and water-repellent effects are not good.

SUMMARY OF THE INVENTION

The present invention provides an optical fiber adapter, which can shelter the beam emitted from an axial accommodation room, and concurrently has dustproof and water-repellent effects.

An optical fiber adapter provided by the present invention includes a body, an inner housing, a fixing seat, a lower movable shutter, an upper movable shutter and a cover. The body has an axial accommodation room. The axial accommodation room is formed by a top wall, a bottom wall and two opposite side walls. The two opposite side walls are connected to the top wall and the bottom wall. The axial accommodation room is provided with at least one partition wall opposite to the two opposite side walls. The partition wall separates the axial accommodation room into at least two accommodation rooms. Two axial ends of each of the accommodation rooms have a first opening and a second opening respectively, wherein the two opposite side walls and two sides of the partition wall have opposite inner surfaces. Each of the inner surfaces forms at least a first thickened component adjacent to the first opening. A side surface of the first thickened component forms an axial guiding portion and a first stopper. The first stopper is located above the axial guiding portion. Corresponding to the two accommodation rooms, the bottom wall of the body forms two slots adjacent to the first opening. The top wall of the body has an access opening. The inner housing includes two inner housing elements. Each of the inner housing elements respectively has two hollow cylinders. The two inner housing elements are fixed in the axial accommodation room. The two hollow cylinders of one of the inner housing elements are located in the two accommodation rooms respectively and are toward the first opening. The two hollow cylinders of the other inner housing element are located in the two accommodation rooms respectively and are toward the second openings. At least two insert slots are formed on the fixing seat. The lower movable shutter includes a lower base, a lower curved connection portion and a lower sheet. The lower curved connection portion is connected to the lower base and the lower sheet. The lower base has a fixing structure. The fixing structure of each of the lower movable shutters is combined with one insert slot of the fixing seat. The fixing seat covers the two slots, and the two lower sheets of the two lower movable shutters are disposed in the accommodation rooms respectively. Two opposite side ends of the lower sheet are located at rear sides of the two first thickened components of the accommodation room respectively, and shelter a portion of the first opening. The upper movable shutter is disposed in the accommodation room. Two opposite side ends of the upper movable shutter are partly located at rear sides of the two first thickened components of the accommodation room respectively and abut against the axial guiding portion and the first stopper. A portion of the upper movable shutter and a portion of the lower sheet are in overlapping and separable contact to shelter the first opening. The cover covers the access opening.

An optical fiber adapter provided by the present invention includes a body, an inner housing, a fixing seat, a lower movable shutter, an upper movable shutter and a cover. The body has an axial accommodation room formed by a top wall, a bottom wall and two opposite side walls. The two opposite side walls are connected to the top wall and the bottom wall. Two axial ends of each axial accommodation room have a first opening and a second opening respectively. The two opposite side walls have opposite inner surfaces. Each of the inner surfaces forms at least a first thickened component adjacent to the first opening. A side surface of the first thickened component forms an axial guiding portion and a first stopper. The first stopper is located above the axial guiding portion. The bottom wall of the body forms a slot adjacent to the first opening. The top wall of the body has an access opening. The inner housing includes two inner housing elements. Each of the inner housing elements has a hollow cylinder respectively. The two inner housing elements are fixed in the axial accommodation room. The hollow cylinder of one of the inner housing elements is toward the first openings. The hollow cylinder of the other inner housing element is toward the second opening. At least one insert slot is formed on the fixing seat. The lower movable shutter includes a lower base, a lower curved connection portion and a lower sheet. The lower curved connection portion is connected to the lower base and the lower sheet. The lower base has a fixing structure. The fixing structure is combined with the insert slot of the fixing seat. The fixing seat covers the slot, and the lower sheet of the lower movable shutter is disposed in the axial accommodation room. Two opposite side ends of the lower sheet are located at rear sides of the two first thickened components of the axial accommodation room respectively, and shelter a portion of the first opening. The upper movable shutter is disposed in the axial accommodation room. Two opposite side ends of the upper movable shutter are partly located at rear sides of the two first thickened components of the axial accommodation room respectively and abut against the axial guiding portion and the first stopper. A portion of the upper movable shutter and a portion of the lower sheet are in overlapping and separable contact to shelter the first opening. The cover covers the access opening.

In an embodiment of the present invention, the top wall further has two shutter positioning openings and a shutter positioning slot. The two shutter positioning openings are adjacent to the first opening and correspond to the two accommodation rooms respectively. The shutter positioning slot is located between the two shutter positioning openings and the access opening.

In an embodiment of the present invention, the upper movable shutter includes an upper base, an upper curved connection portion and an upper sheet. The upper curved connection portion is connected to the upper base and the upper sheet. The two upper bases of the two upper movable shutters are combined with the shutter positioning slot on the top wall of the body, and cover the two shutter positioning openings. The two upper sheets of the two upper movable shutters are disposed in an accommodation room respectively. Two opposite side ends of the upper sheet are located at rear sides of the two first thickened components of the accommodation room respectively and abut against the axial guiding portion and the first stopper, and a portion of the upper sheet is in contact with the lower sheet.

In an embodiment of the present invention, the inner surface further forms a second thickened component and a third thickened component. The third thickened component is adjacent to the second opening. The second thickened component is located between the first thickened component and the third thickened component. An actuating space of the upper sheet and the lower sheet in the accommodation room is defined between the first thickened components and the second thickened components. A setting space of the two inner housing elements in the axial accommodation room is defined between the second thickened components and the third thickened components. In an embodiment, the defined setting space is an elongated notch.

In an embodiment of the present invention, a profile of a rear side surface of the first thickened component corresponds to a profile where the upper sheet and the lower sheet are in partially overlapping contact.

In an embodiment of the present invention, the optical fiber adapter further includes a light-transmitting stopper. A visible opening is defined between the first stopper and the axial guiding portion. The upper sheet of the upper movable shutter includes a first upper sheet and a second upper sheet. The first upper sheet is located between the upper curved connection portion and the second upper sheet. A width of the second upper sheet is smaller than a width of the first upper sheet to reveal the visible opening. The light-transmitting stopper covers the second upper sheet, and a portion of the light-transmitting stopper shelters the visible opening.

In an embodiment of the present invention, the two opposite side walls and a bottom of the partition wall of the body form opposite positioning notches. The fixing seat includes a first platform component, a second platform component and a third platform component. The first platform component is connected to the second platform component. A second front side surface of the second platform component is connected to the third platform component. A drop space is formed between the second platform component and the third platform component. The second platform component is provided with the insert slots. Two opposite side ends of the first platform component of the fixing seat are engaged in the two positioning notches of the body respectively.

In an embodiment of the present invention, each of the slots has a front inner wall and a rear inner wall opposite to each other. Corresponding to the two accommodation rooms, two first notches and two second notches are formed on the bottom wall of the body. Each of the first notches is extended to the slot from the first opening. Each of the second notches penetrates a portion of the rear inner wall of the slot. Corresponding to the two accommodation rooms, a first rear side surface of the first platform component is provided with two first fasteners. A leading edge of the third platform component is provided with two second fasteners. The first rear side surface of the first platform component abuts against the rear inner wall of the slot, and the two first fasteners are engaged in the two second notches respectively. A third front side surface of the third platform component abuts against the front inner wall of the slot, and the two second fasteners are engaged in the first notches respectively.

In an embodiment of the present invention, a bottom edge of a first front side surface of the first platform component is connected to a top edge of a second rear side surface of the second platform component. The first front side surface of the first platform component extends at least two bulge components located on the second platform component to form a plurality of placement notches. The insert slots are located in the placement notches.

In an embodiment of the present invention, the lower base of each of the lower movable shutters includes a step structure and the fixing structure. The fixing structure includes at least one fold piece. The step structure is disposed in the drop space of the fixing seat. The fold piece is inserted in an insert slot.

In an embodiment of the present invention, a side of each of the second fasteners facing the second front side surface forms a curved surface. A second convex surface of the lower curved connection portion of each of the lower movable shutters abuts against the curved surface.

In an embodiment of the present invention, the two lower bases of the two lower movable shutters are connected by a connecting piece.

In an embodiment of the present invention, an end of the upper base of the upper movable shutter has a curved component abutting against a rear wall surface of the shutter positioning slot.

In an embodiment of the present invention, the optical fiber adapter includes two upper movable shutters, wherein the two upper bases of the two upper movable shutters are connected together.

In an embodiment of the present invention, two opposite sides of the inner housing elements respectively have a convex component and a concave component, wherein the convex component of one of the inner housing elements is combined with the concave component of the other inner housing element so that the two inner housing elements are engaged to each other.

In an embodiment of the present invention, a top edge of the inner housing element is provided with a plurality of housing fasteners, wherein the housing fasteners and the hollow cylinders are toward the same direction.

In an embodiment of the present invention, at least one second stopper is disposed on the bottom wall in front of each of the slots.

In an embodiment of the present invention, a plurality of longitudinal meshing components and a plurality of lateral fasteners are formed on a surface of the cover facing the access opening. The longitudinal meshing components have a disconnection notch to engage the two inner housing elements, and the housing fasteners of the two inner housing elements are engaged to the longitudinal meshing components respectively. The lateral fasteners are adjacent to the disconnection notches and clamp top edges of the two inner housing elements.

In an embodiment of the present invention, at least one second stopper is disposed on the bottom wall in front of the slots.

The present invention uses the upper movable shutter and the lower movable shutter, so that the openings can be sheltered closely. Therefore, the beam emitted from the axial accommodation room can be sheltered, and concurrently dustproof and water-repellent effects are provided.

In order to make the above and other objects, features and advantages of the present invention more apparent and obvious, the following embodiments, together with the drawings, are described in detail below.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
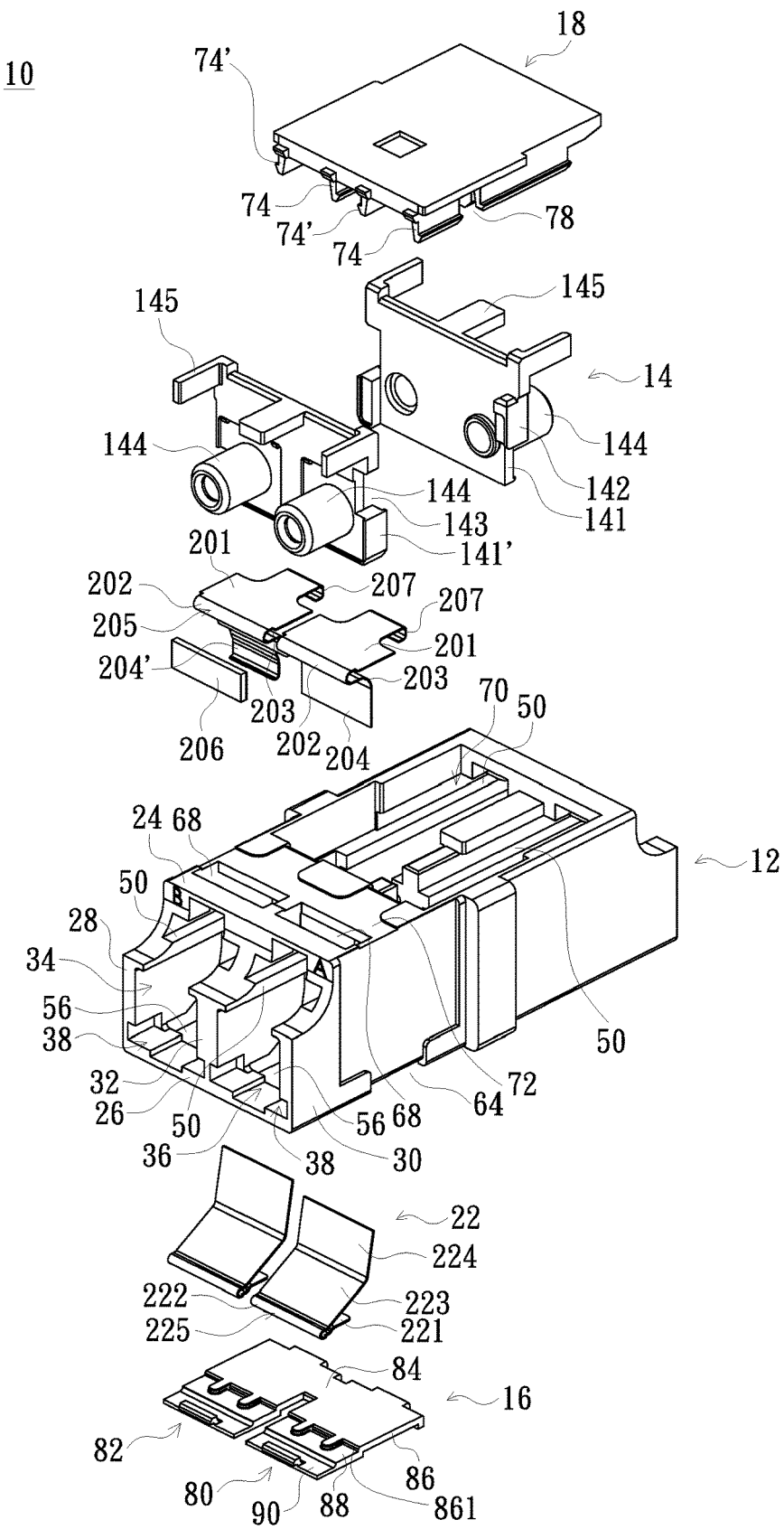
FIG. 1 and FIG. 2 are respectively three-dimensional exploded schematic views of different perspectives of an optical fiber adapter according to an embodiment of the present invention.
Figure 2:
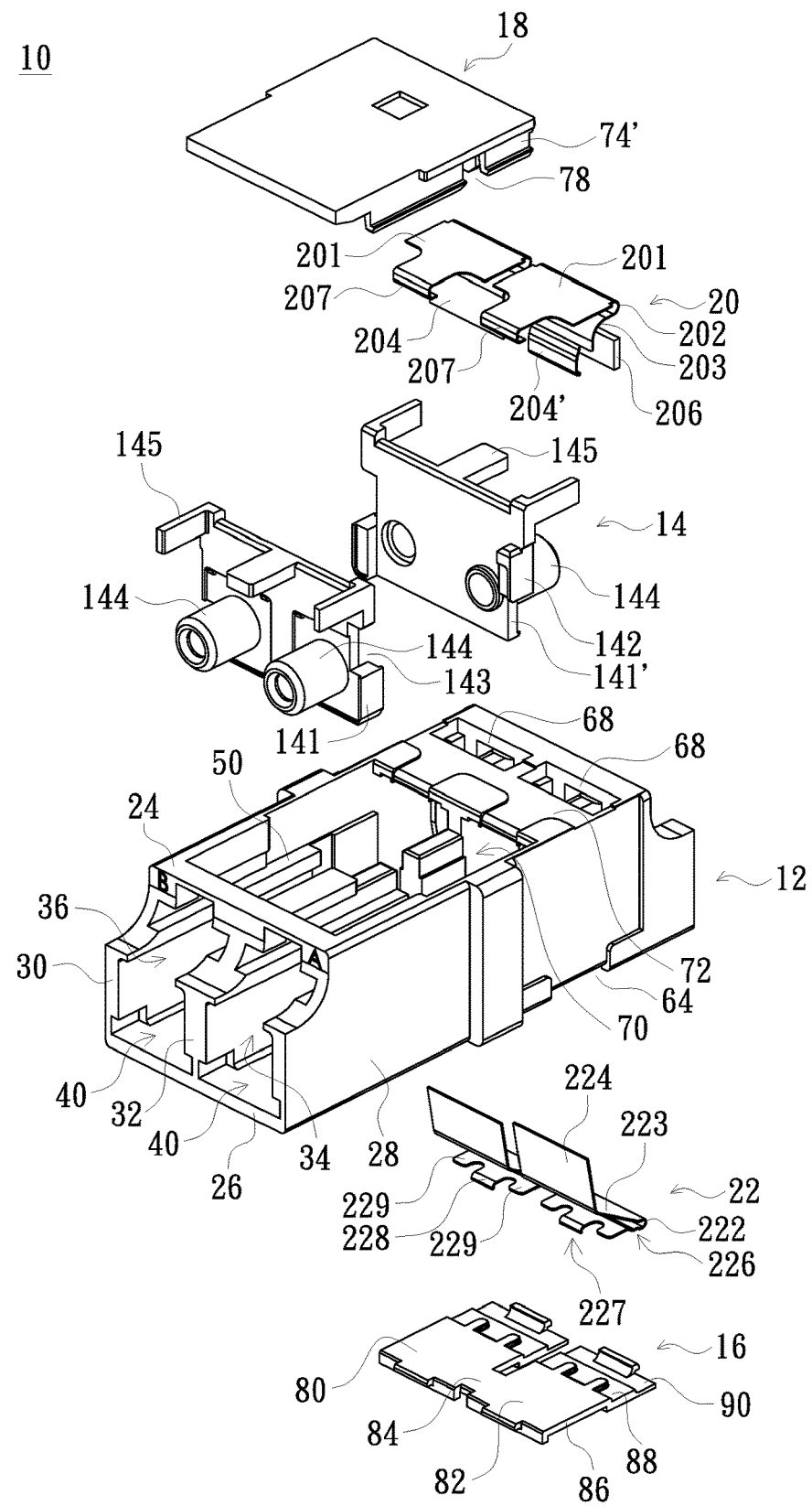

FIG. 1 and FIG. 2 are respectively three-dimensional exploded schematic views of different perspectives of an optical fiber adapter according to an embodiment of the present invention. As shown in FIG. 1 and FIG. 2, an optical fiber adapter 10 is, for example, a duplex optical fiber adapter, including a body 12, an inner housing 14, a fixing seat 16, a cover 18, an upper movable shutter 20 and a lower movable shutter 22. The body 12 has an axial accommodation room (unlabeled), which has a top wall 24, a bottom wall 26, a left side wall 28 and a right side wall 30, wherein the top wall 24 is opposite to the bottom wall 26, and the left side wall 28 is opposite to the right side wall 30. Corresponding to the duplex optical fiber adapter, the axial accommodation room is separated by a partition wall 32, which is parallel to the left side wall 28 and the right side wall 30 and connected to the top wall 24 and the bottom wall 26, into a left accommodation room 34 and a right accommodation room 36. The left accommodation room 34 is defined by the top wall 24, the bottom wall 26, the partition wall 32 and the left side wall 28. The right accommodation room 36 is defined by the top wall 24, the bottom wall 26, the partition wall 32 and the right side wall 30. The left accommodation room 34 and the right accommodation room 36 have first openings 38 (shown in FIG. 1) and second openings 40 (shown in FIG. 2) at two axial ends, respectively. The structures of the left accommodation room 34 and the right accommodation room 36 correspond to each other.

Figure 3:
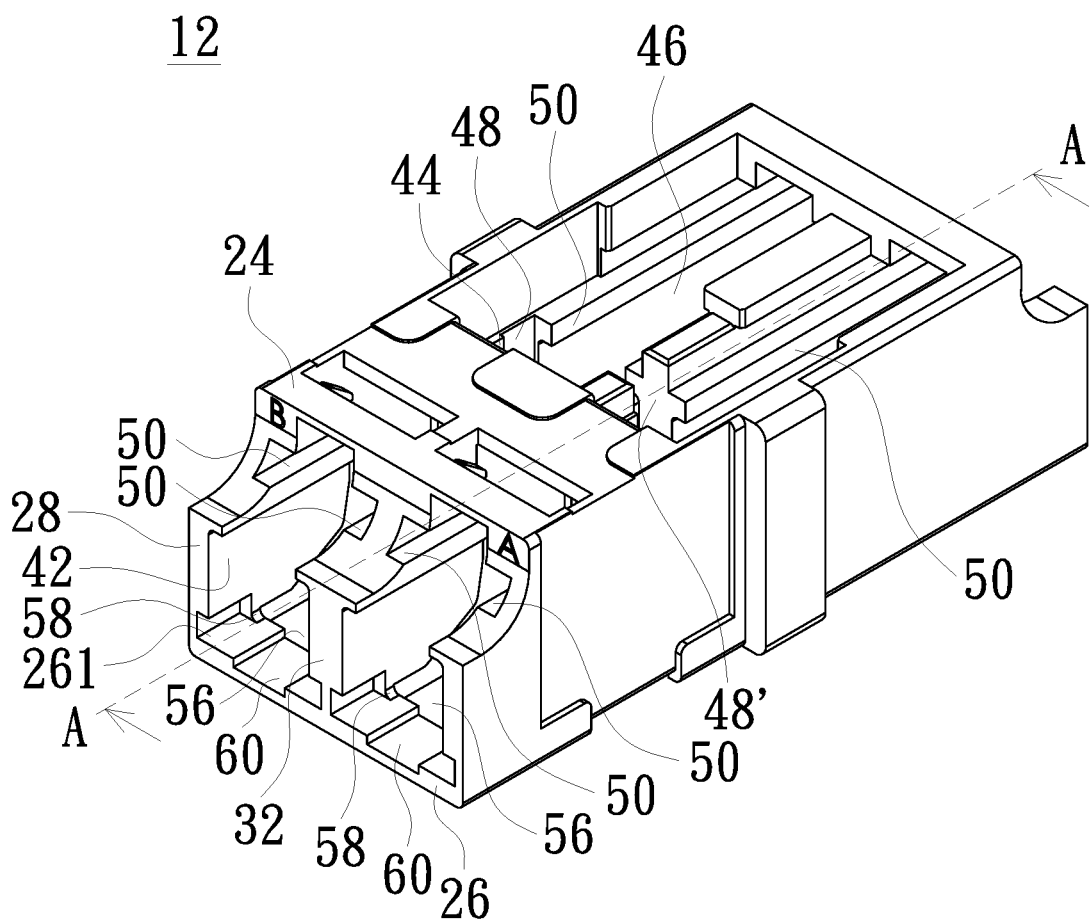
FIG. 3 and FIG. 4 are respectively schematic views of different perspectives of a body of an optical fiber adapter according to an embodiment of the present invention.
Figure 4:
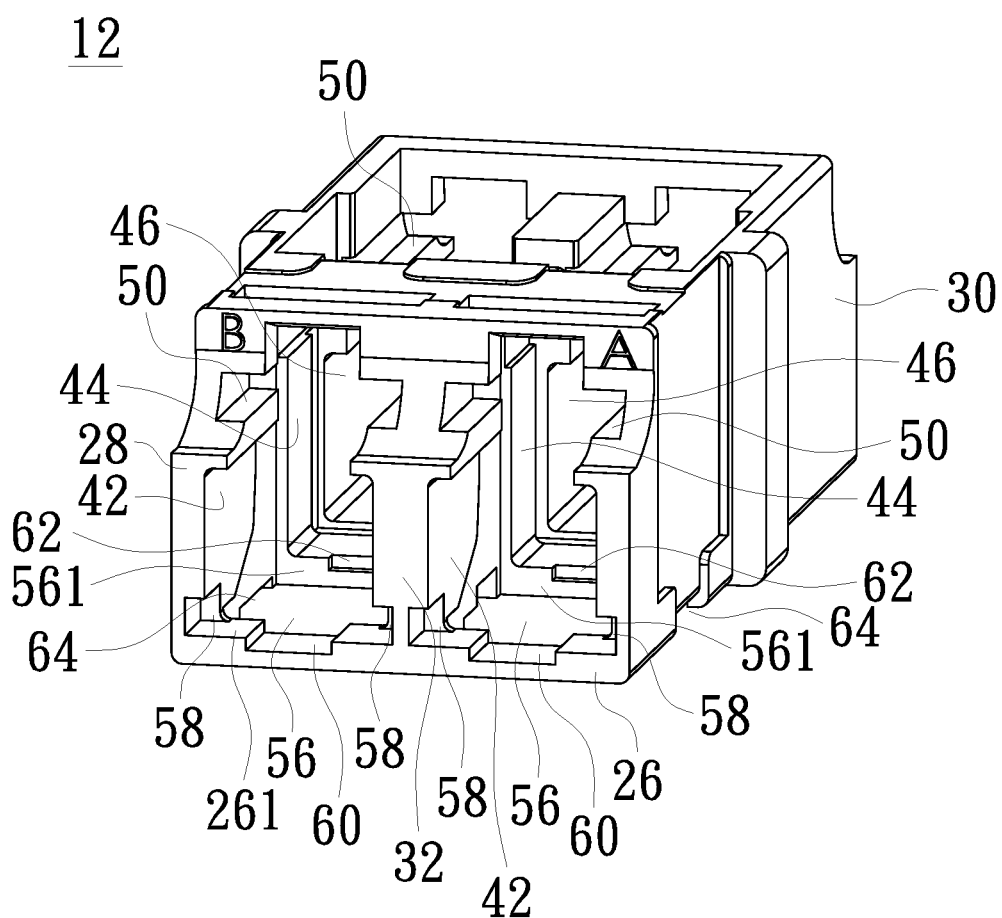
Figure 5:
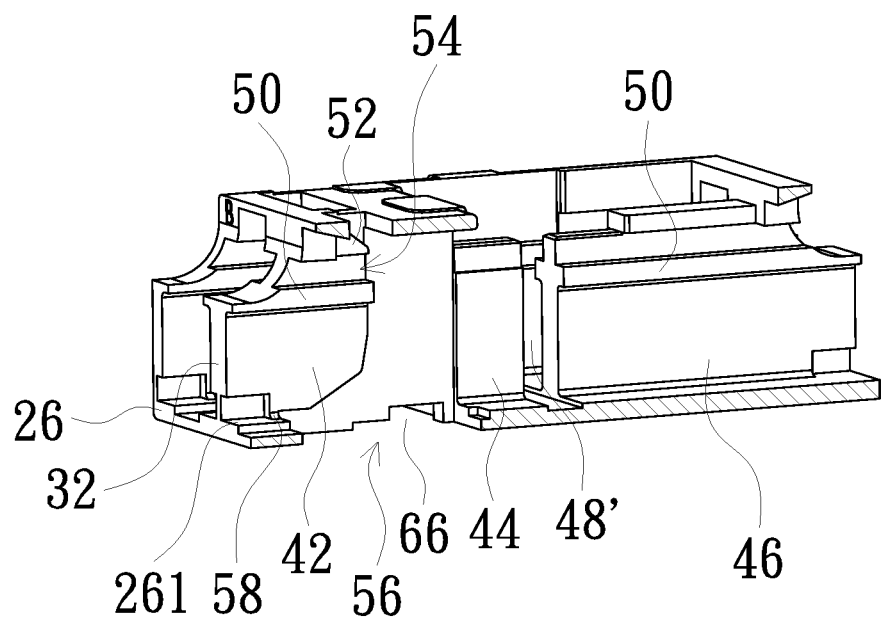
FIG. 5 is a cross-sectional structural schematic view of a body according to an embodiment of the present invention.

FIG. 3 and FIG. 4 are respectively schematic views of different perspectives of a body of an optical fiber adapter according to an embodiment of the present invention. FIG. 5 is a cross-sectional structural schematic view of a body according to an embodiment of the present invention, wherein FIG. 5 is a cross-sectional schematic view along the A-A line segment of FIG. 3. As shown in FIG. 3, FIG. 4 and FIG. 5, in the left accommodation room 34, the left side wall 28 and one side of the partition wall 32 have two opposite inner surfaces. In the right accommodation room 36, the right side wall 30 and one side of the partition wall 32 have two opposite inner surfaces. A front section, a middle section and a rear section of each inner surface form a first thickened component 42, a second thickened component 44 and a third thickened component 46 respectively. The first thickened components 42, the second thickened components 44 and the third thickened components 46 on each inner surface correspond to each other. As shown in FIG. 5, a rear side surface of the first thickened component 42 slightly outlines a shape of ">". An actuating space of the upper movable shutter 20 and the lower movable shutter 22 in the left accommodation room 34/the right accommodation room 36 is defined between the first thickened component 42 and the second thickened component 44. A setting space of the inner housing 14 in the left accommodation room 34/the right accommodation room 36 is defined between the second thickened component 44 and the third thickened component 46.

In an embodiment, an elongated notch 48 (shown in FIG. 3) is formed between the second thickened component 44 and the third thickened component 46 of the left side wall 28/the right side wall 30 An elongated notch 48' across the thickness of the partition wall 32 is formed between the second thickened components 44 and the third thickened components 46 of the partition wall 32. The elongated notches 48 and 48' correspond to and interlink each other for setting the inner housing 14. The side surfaces of each of the first thickened components 42 and each of the third thickened components 46 form opposite axial guiding portions 50 respectively, which are extended from the first openings 38 towards the second openings 40. As shown in FIG. 5, a first stopper 52 is formed on each of the first thickened components 42 and above the axial guiding portion 50. A visible opening 54 is defined between the first stopper 52 and the axial guiding portion 50.

Following the above description, the bottom wall 26 of the body 12 has a bottom wall upper surface 261 and a bottom wall lower surface (unlabeled) opposite to each other. As shown in FIG. 3 and FIG. 4, corresponding to the duplex optical fiber adapter, the bottom wall 26 has two slots 56 penetrating through the bottom wall upper surface 261 and the bottom wall lower surface. The position of each of the slots 56 is located between the left side wall 28 and the partition wall 32, and between the right side wall 30 and the partition wall 32, respectively, and the two slots 56 are extended from near the first openings 38 to the second thickened components 44. Two second stoppers are disposed in front of each slot 56 and on the bottom wall upper surface 261. As shown in FIG. 4 and FIG. 5, the two second stoppers 58 in the left accommodation room 34 are located at a junction of the first thickened component 42 of the left side wall 28 and the bottom wall upper surface 261, and at a junction of the first thickened component 42 of the partition wall 32 and the bottom wall upper surface 261, respectively. The two second stoppers 58 in the right accommodation room 36 are located at a junction of the first thickened component 42 of the right side wall 30 and the bottom wall upper surface 261, and at a junction of the first thickened component 42 of the partition wall 32 and the bottom wall upper surface 261, respectively.

As shown in FIG. 4, each of the slots 56 has a front inner wall (unlabeled) and a rear inner wall 561 opposite to each other. The bottom wall upper surface 261 forms a first notch 60 extended from the first opening 38 (shown in FIG. 1) to the slot 56. The bottom wall upper surface 261 forms a second notch 62 penetrating through a portion of the rear inner wall 561 of the slot 56. Also, the bottoms of the left side wall 28 and the right side wall 30 form opposite positioning notches 64 respectively, which are located at a side of each of the slots 56 adjacent to the left side wall 28/the right side wall 30. The bottom of the partition wall 32 corresponding to the positioning notch 64 forms a positioning notch 66 (shown in FIG. 5).

Following the above description, as shown in FIG. 1 and FIG. 2, the top wall 24 of the body 12 has shutter positioning openings 68 and an access opening 70. In the embodiment, corresponding to the duplex optical fiber adapter, the top wall 24, partitioned by the partition wall 32, is provided with two shutter positioning openings 68 to individually allow an upper movable shutter 20 to be placed in the left accommodation room 34/the right accommodation room 36. Also, a shutter positioning slot 72 is formed between the access opening 70 and the shutter positioning openings 68 on the top wall 24.

As shown in FIG. 1 and FIG. 2, the inner housing 14 included in the optical fiber adapter 10 is two identical inner housing elements 141, 141', engaged with each other by their respective convex component 142 and concave component 143. Corresponding to the duplex optical fiber adapter, each of the inner housing elements 141, 141' has two hollow cylinders 144 and a plurality of housing fasteners 145 disposed at top edges of the inner housing elements 141, 141' and toward the same direction as the hollow cylinders 144.

Figure 6:
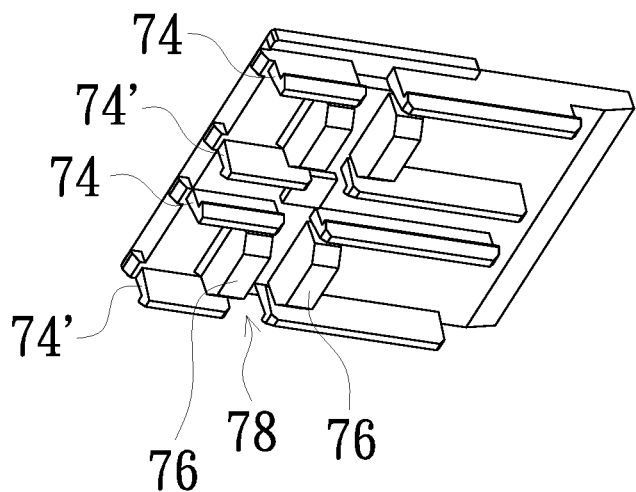
FIG. 6 is a structural schematic view of a cover according to an embodiment of the present invention.

FIG. 6 is a structural schematic view of a cover according to an embodiment of the present invention. As shown in FIG. 1, FIG. 2 and FIG. 6, positions of a lower surface of the cover 18 corresponding to the left accommodation room 34 and the right accommodation room 36 are individually provided with two corresponding longitudinal meshing components 74, 74' and two lateral fasteners 76. Middle sections of the longitudinal meshing components 74, 74' have disconnection notches 78 for setting the inner housing 14. The two lateral fasteners 76 are disposed between the two corresponding longitudinal meshing components 74, 74' and adjacent to the disconnection notches 78.

As shown in FIG. 1 and FIG. 2, in the embodiment, corresponding to the duplex optical fiber adapter, the fixing seat 16 includes a first fixing seat 80 and a second fixing seat 82. The first fixing seat 80 and the second fixing seat 82 are connected by a connecting section 84. The structures of the first fixing seat 80 and the second fixing seat 82 are the same. A portion of a left side of the first fixing seat 80 and a portion of a right side of the second fixing seat 82 can be engaged in the positioning notches 64 of the left side wall 28 and the right side wall 30 respectively, and the connecting section 84 is engaged in a positioning notch 66 (shown in FIG. 5) of the partition wall 32 to correspondingly cover the slots 56 of the left accommodation room 34 and the right accommodation room 36. The first fixing seat 80 is taken as an example to illustrate the technical features of the present invention as follows. The structure of the second fixing seat 82 corresponds to that of the first fixing seat 80.

Figure 7:
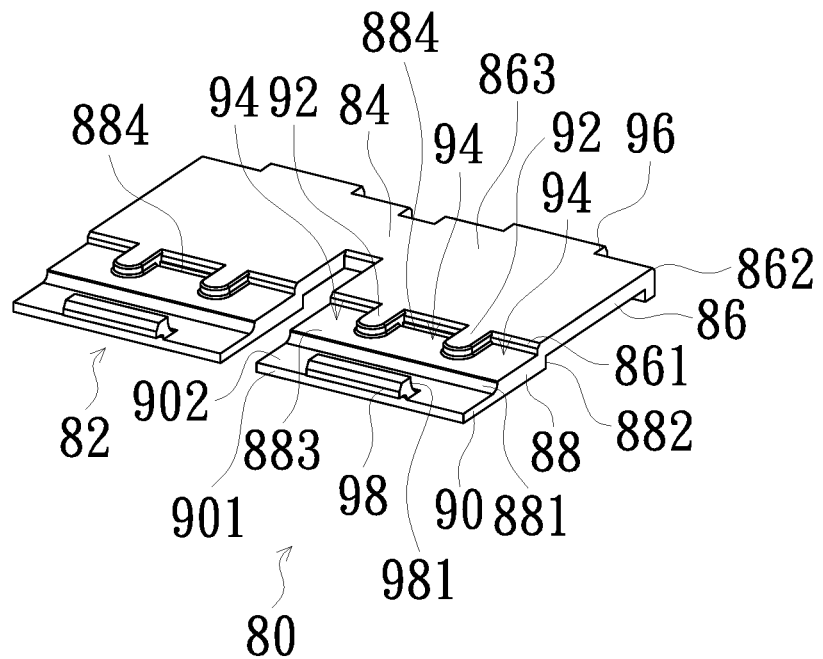
FIG. 7 is a structural schematic view of a fixing seat according to an embodiment of the present invention.

FIG. 7 is a structural schematic view of a fixing seat according to an embodiment of the present invention. Please refer to FIG. 7. The first fixing seat 80 includes a first platform component 86, a second platform component 88 and a third platform component 90. The first platform component 86 has a first front side surface 861 and a first rear side surface 862 opposite to each other, and a first upper surface 863 and a first lower surface (unlabeled) opposite to each other. The second platform component 88 has a second front side surface 881 and a second rear side surface 882 opposite to each other, and a second upper surface 883 and a second lower surface (unlabeled) opposite to each other. The third platform component 90 has a third front side surface 901 and a third rear side surface (unlabeled) opposite to each other, and a third upper surface 902 and a third lower surface (unlabeled) opposite to each other. A bottom edge of the first front side surface 861 is connected to a top edge of the second rear side surface 882. The first front side surface 861 extends two bulge components 92 located on the second upper surface 883 of the second platform component 88, and the two bulge components 92 define three placement notches 94. An insert slot 884 is set on the second upper surface 883 and in one of the placement notches 94. In an embodiment, the insert slot 884 is disposed on the second upper surface 883 and adjacent to the first front side surface 861. The insert slot 884 may penetrate or not penetrate the second platform component 88. A first fastener 96 is disposed on the first rear side surface 862 of the first platform component 86. The second front side surface 881 of the second platform component 88 is connected to a third rear side surface of the third platform component 90, and a drop space (unlabeled) is formed between the second upper surface 883 and the third upper surface 902. A second fastener 98 is disposed at a leading edge of the third upper surface 902. A side of the second fastener 98 facing the second front side surface 881 forms a curved surface 981. In an embodiment, the first platform component 86 and the second platform component 88 can also be of the same height without a drop relationship, that is, the first upper surface 863 and the second upper surface 883 are coplanar.

As shown in FIG. 1 and FIG. 2, the left accommodation room 34 and the right accommodation room 36 individually have both an upper movable shutter 20 and a lower movable shutter 22. The upper movable shutter 20 and the lower movable shutter 22 are elastic and are formed by bending metal sheets. In an embodiment, the upper movable shutter 20 includes an upper base 201, an upper curved connection portion 202 and an upper sheet, wherein the upper sheet includes a first upper sheet 203 and a second upper sheet 204. An end of the upper base 201 has a curved component 207. The upper curved connection portion 202 has a first convex surface 205. The upper curved connection portion 202 is connected to the upper base 201 and the first upper sheet 203. The second upper sheet 204 is connected to a bottom edge of the first upper sheet 203. In an embodiment, as shown in the upper movable shutter 20 located in the right accommodation room 36, the first upper sheet 203 has the same width as the second upper sheet 204, but is not limited thereto.

In another embodiment, as shown in the upper movable shutter 20 located in the left accommodation room 34, the upper movable shutter 20 includes an upper base 201, an upper curved connection portion 202, a first upper sheet 203, a second upper sheet 204' and a light-transmitting stopper 206, wherein the width of the second upper sheet 204' is smaller than the width of the first upper sheet 203, and the second upper sheet 204' slightly outlines a shape of "J" from the side. The light-transmitting stopper 206 covers the second upper sheet 204', and the width of the light-transmitting stopper 206 is greater than the width of the second upper sheet 204'. In an embodiment, the width of the light-transmitting stopper 206 is equivalent to the width of the first upper sheet 203.

In the embodiment shown in FIG. 1 and FIG. 2, the width of the second upper sheet 204 of the upper movable shutter 20 corresponding to the right accommodation room 36 is configured to be the same as that of the first upper sheet 203. The second upper sheet 204' of the upper movable shutter 20 corresponding to the left accommodation room 34 is configured to cover the light-transmitting stopper 206, but not limited thereto. In other embodiments, both the upper movable shutters 20 may be designed to have a light-transmitting stopper 206, or to have no light-transmitting stopper 206. In another embodiment, the light-transmitting stopper 206 may also be disposed in the lower movable shutter 22.

As shown in FIG. 1 and FIG. 2, the lower movable shutter 22 includes a lower base 221, a lower curved connection portion 222 and a lower sheet, wherein the lower sheet includes a first lower sheet 223 and a second lower sheet 224. The lower curved connection portion 222 has a second convex surface 225. The lower curved connection portion 222 is connected to the lower base 221 and the first lower sheet 223. The second lower sheet 224 is connected to a top edge of the first lower sheet 223. The connected first lower sheet 223 and second lower sheet 224 slightly outline a shape of ">" from the side to correspond to the rear side profile of the first thickened component 42. The lower base 221 includes a step structure 226 and a fixing structure 227. The fixing structure 227 includes a fold piece 228 and two fixing pieces 229 located on two sides of the fold piece 228. In an embodiment not shown, the width of the second lower sheet 224 may be smaller than the width of the first lower sheet 223, and a light-transmitting stopper 206 is used to cover the second lower sheet 224.

Figure 8:
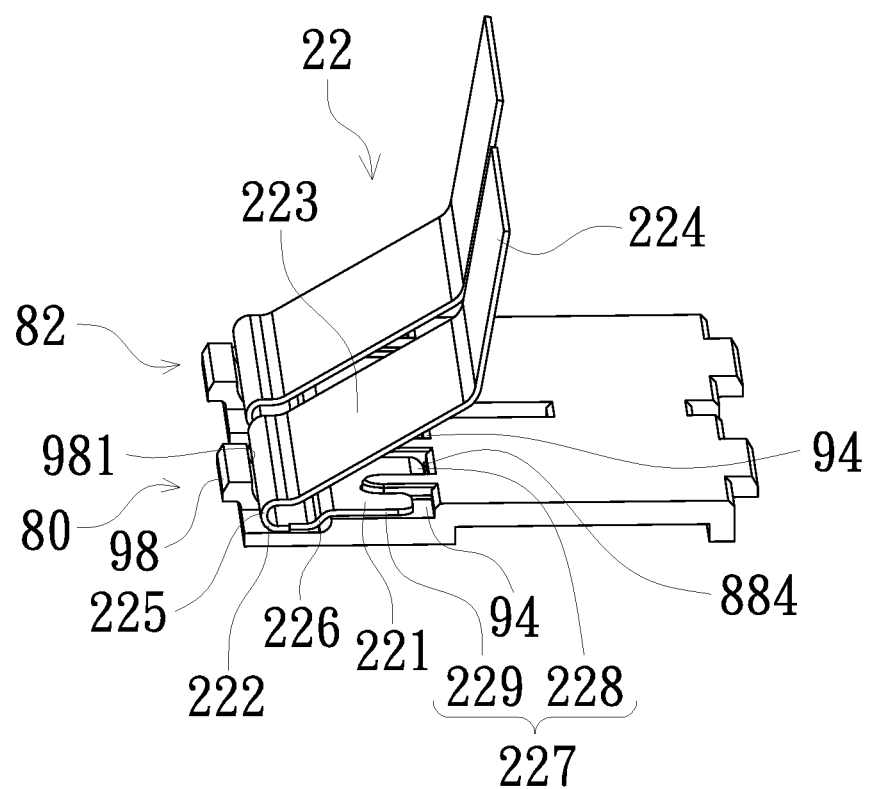
FIG. 8 is a schematic view of assembly of a fixing seat and a lower movable shutter according to an embodiment of the present invention.

While assembling the optical fiber adapter 10 of the present invention, the first fixing seat 80 and the second fixing seat 82 are respectively used to fix a lower movable shutter 22. As shown in FIG. 8, the step structure 226 of the lower base 221 of the lower movable shutter 22 is disposed in a drop space of the first fixing seat 80/the second fixing seat 82. The fold piece 228 of the fixing structure 227 is inserted in the insert slot 884. The two fixing pieces 229 are positioned in the placement notches 94 respectively, and the second convex surface 225 of the lower curved connection portion 222 abuts against the curved surface 981 of the second fastener 98 at a leading edge of the first fixing seat 80/the second fixing seat 82. The connected first lower sheet 223 and second lower sheet 224 can be moved relative to the first fixing seat 80/the second fixing seat 82 by the lower curved connection portion 222.

Figure 9:
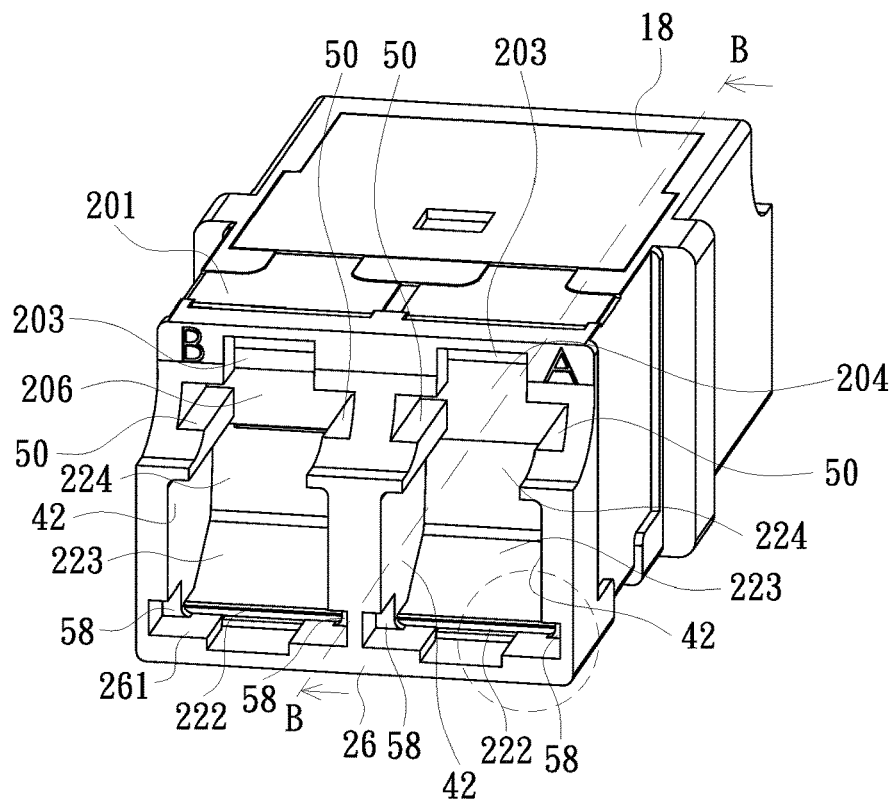
FIG. 9 and FIG. 9A are a three-dimensional schematic view and its partial enlarged view of an optical fiber adapter according to an embodiment of the present invention.
Figure 9A:
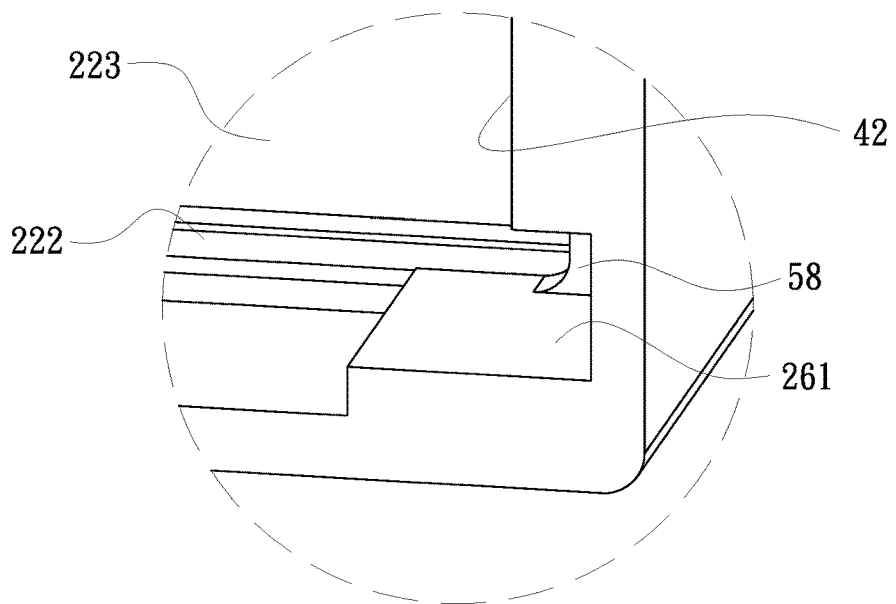
Figure 10:
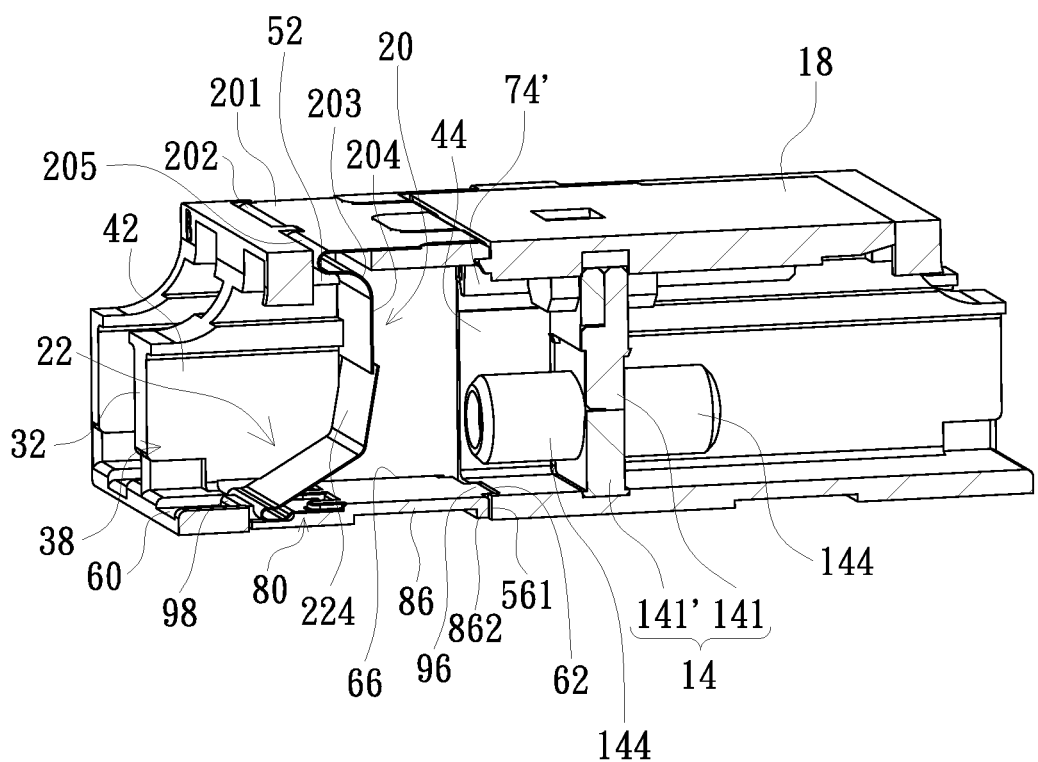
FIG. 10 is a cross-sectional schematic view of an optical fiber adapter according to an embodiment of the present invention.

FIG. 9 and FIG. 9A are a three-dimensional schematic view and its partial enlarged view of an optical fiber adapter according to an embodiment of the present invention. FIG. 10 is a cross-sectional schematic view of an optical fiber adapter according to an embodiment of the present invention, wherein FIG. 10 is a cross-sectional schematic view along the B-B line segment of FIG. 9. As shown in FIG. 1, FIG. 2, FIG. 9 and FIG. 10, the first fixing seat 80, through a left side end of the first platform component 86 (for the second fixing seat 82, through a right side end of the first platform component 86), is engaged in the positioning notch 64 and covers the slot 56. The connecting section 84, which connects the first fixing seat 80 and the second fixing seat 82, abuts against the positioning notch 66 of the partition wall 32. The first rear side surface 862 of the first platform component 86 abuts against the rear inner wall 561 of the slot 56, and the first fastener 96 is engaged in the second notch 62. The third front side surface 901 of the third platform component 90 abuts against the front inner wall of the slot 56, and the second fastener 98 is engaged in the first notch 60. In the embodiment, the first fixing seat 80 and the second fixing seat 82 are combined with the body 12 by means of mechanical clamping, but the invention is not limited thereto. In other embodiments, the first fixing seat 80 and the second fixing seat 82 are assembled with the body 12 by means of gluing or ultrasonic welding, etc.

With the first fixing seat 80/the second fixing seat 82 covering the slot 56, the first lower sheet 223 and the second lower sheet 224 are disposed in the left accommodation room 34/the right accommodation room 36. The first lower sheet 223 and the second lower sheet 224 face the first opening 38 and can shelter the lower half of the first opening 38. The first lower sheet 223 and the second lower sheet 224 can be moved by the lower curved connection portion 222 relative to the first fixing seat 80/the second fixing seat 82 in an actuating space defined between the first thickened components 42 and the second thickened components 44. Two sides of the first lower sheet 223 and the second lower sheet 224 are located behind the first thickened components 42.

There is a gap between the two sides of the first lower sheet 223 and the second lower sheet 224 and the left side wall 28/the right side wall 30 and the inner surface of the partition wall 32 respectively, so that the first lower sheet 223 and the second lower sheet 224 can be actuated smoothly. The first thickened component 42 is used to shelter the gap. As shown in FIG. 9A, two opposite ends of the lower curved connection portion 222 of the lower movable shutter 22 are located behind the two second stoppers 58 of the bottom wall upper surface 261, respectively.

As shown in FIG. 1 and FIG. 2, the upper base 201 of each of the upper movable shutters 20 is fastened in the shutter positioning slot 72 of the top wall 24, and the curved component 207 abuts against a rear wall surface of the shutter positioning slot 72. The upper base 201 covers the shutter positioning opening 68. The first convex surface 205 of the upper curved connection portion 202 abuts against a front inner wall of the shutter positioning opening 68. As shown in FIG. 9 and FIG. 10, the connected first upper sheet 203 and second upper sheet 204/204' are located in the right accommodation room 36/the left accommodation room 34. The first upper sheet 203 and the second upper sheet 204/204' face the first opening 38. A lower end of the second upper sheet 204/204' and an upper end of the second lower sheet 224 of the lower movable shutter 22 are in overlapping and separable contact to completely shelter the first opening 38. The first upper sheet 203 and the second upper sheet 204/204' can be moved by the upper curved connection portion 202 relative to the upper base 201 in an actuating space defined between the first thickened components 42 and the second thickened components 44.

If an upper movable shutter 20 without the light-transmitting stopper 206 is used (for example, the upper movable shutter 20 in the right accommodation room 36), the first upper sheet 203 and the second upper sheet 204 are located behind the first thickened components 42. There is a slight gap between two opposite side ends of the first upper sheet 203 and the second upper sheet 204 and the right side wall 30 and the inner surface of the partition wall 32, respectively, so that the first upper sheet 203 and the second upper sheet 204 are not in contact with the right side wall 30 and the opposite inner surface of the partition wall 32 during operation, and can be actuated smoothly. Through the design of the first thickened component 42, the gap can be sheltered. The first stoppers 52 on the first thickened components 42 abut against a portion of the two sides of the first upper sheet 203, so as to provide the effect of stopping while the first upper sheet 203 is actuated.

If an upper movable shutter 20 with the light-transmitting stopper 206 is used (for example, the upper movable shutter 20 in the left accommodation room 34), the two sides of the first upper sheet 203 and two sides of the light-transmitting stopper 206 covering the second upper sheet 204' are located behind the first thickened components 42. A portion of the light-transmitting stopper 206 can be seen via the visible opening 54.

As shown in FIG. 1, FIG. 2 and FIG. 10, the inner housing elements 141, 141', which are engaged with each other, are placed in the body 12 via the access opening 70, so that the hollow cylinders 144 are toward the first openings 38 and the second openings 40, respectively. Two opposite sides of each of the inner housing elements 141, 141' are placed into the elongated notches 48 (shown in FIG. 3) of the left side wall 28 and the right side wall 30, respectively. Middle portions of the inner housing elements 141, 141' are placed in the elongated notch 48' of the partition wall 32.

As shown in FIG. 1, FIG. 2, FIG. 6, FIG. 9 and FIG. 10, the cover 18 covers the access opening 70. Top edges of the two inner housing elements 141, 141' are positioned in the disconnection notches 78 of the longitudinal meshing components 74, 74'. The two corresponding lateral fasteners 76 clamp the top edges of the two inner housing elements 141, 141'. The longitudinal meshing components 74, 74' are combined with the housing fasteners 145.

Figure 11:
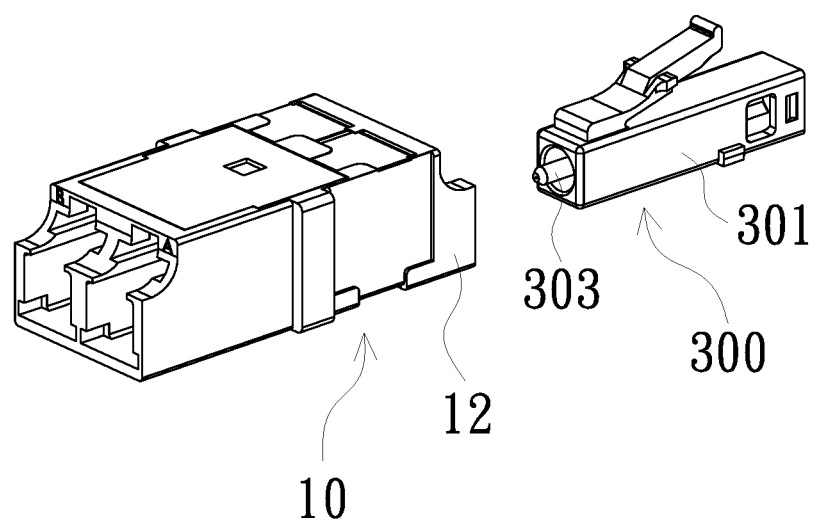
FIG. 11 is a schematic view of an optical fiber adapter and an optical fiber connector according to an embodiment of the present invention.

As shown in FIG. 11, the optical fiber adapter 10 can be used to connect to optical fiber connectors 300. Generally, the optical fiber connector 300 has a substantially rectangular shape, and its cross section is square. The optical fiber connector 300 includes a hollow and rectangular housing 301. A flexible latch 302 is disposed on the top wall of the housing 301. The optical fiber connector 300 includes a ferrule 303 located in the housing 301. The ferrule 303 is extended from a circular opening at a front end of the housing 301.

Figure 12:
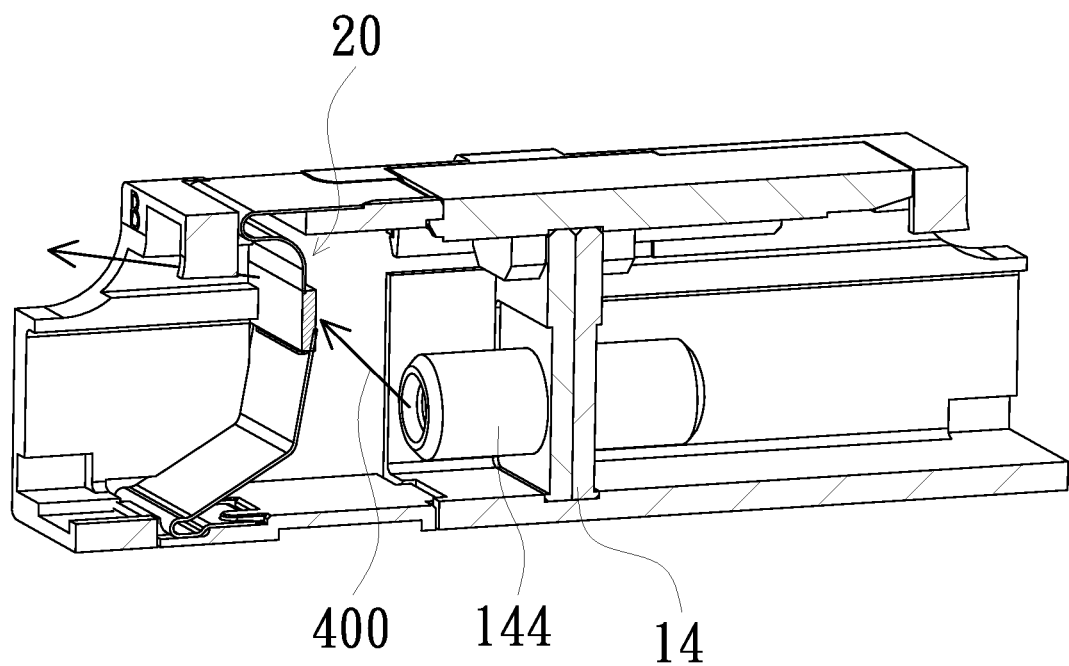
FIG. 12 is a schematic view of a beam penetrating an upper movable shutter with a light-transmitting stopper according to an embodiment of the present invention.

When the optical fiber connector 300 is not inserted into the body 12 from the first opening 38 of the optical fiber adapter 10, as shown in FIG. 9 and FIG. 10, the first upper sheet 203 of the upper movable shutter 20 itself has a preload to closely abut against the rear sides of the first stoppers 52. At the same time, the first lower sheet 223 and the second lower sheet 224 of the lower movable shutter 22 themselves also have a preload to closely abut against the rear sides of the first thickened components 42, so that the first upper sheet 203, the second upper sheet 204, the first lower sheet 223 and the second lower sheet 224 can tightly close the first opening 38. When the optical fiber connector 300 is inserted into the body 12 from the second opening 40, the beam emitted by the optical fiber connector 300 is emitted from the hollow cylinder 144 of the inner housing 14 toward the first opening 38, and can be sheltered by the first upper sheet 203, the second upper sheet 204, the first lower sheet 223 and the second lower sheet 224, so as to prevent the beam from damaging the eyes. In addition, as shown in FIG. 12, using the upper movable shutter 20 with the light-transmitting stopper 206, the user can use the human eyes to observe the beam 400 via the light-transmitting stopper 206 to confirm whether the optical path of the optical fiber is smooth.

Figure 13:
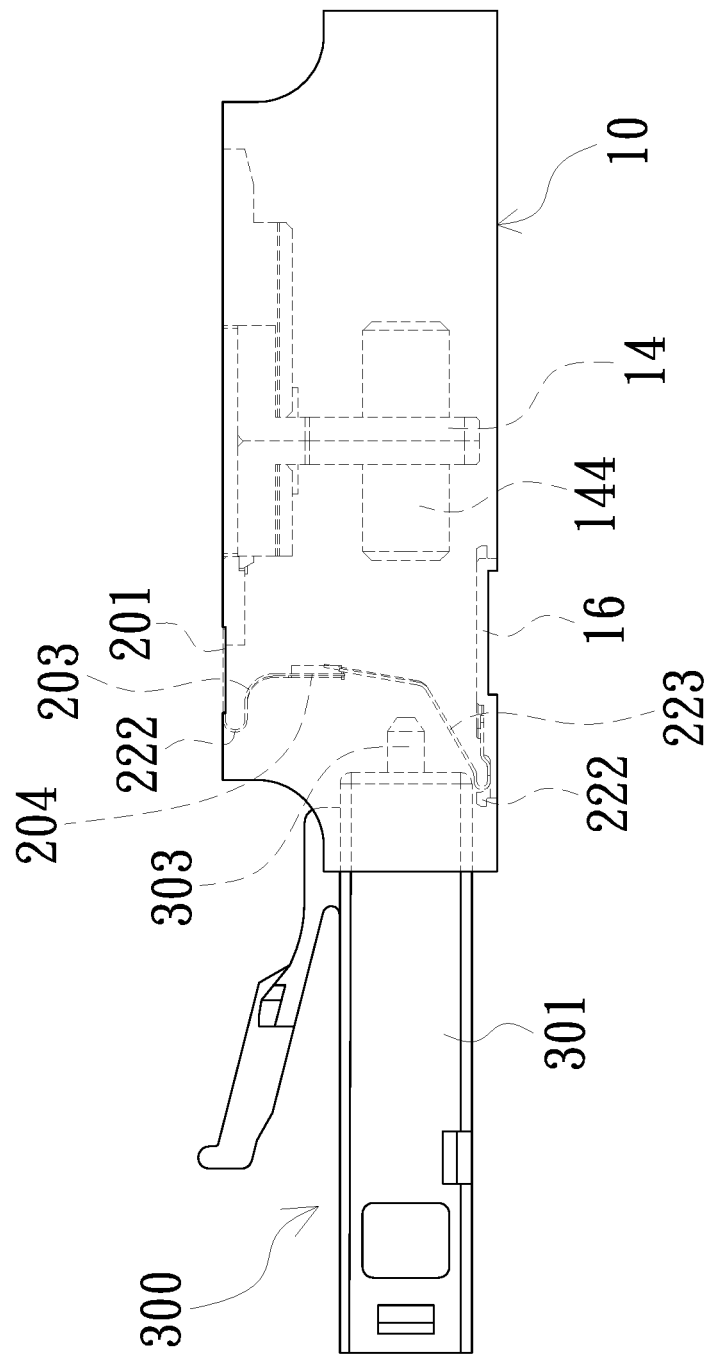
FIG. 13 is a schematic view of an optical fiber connector actuated relative to an optical fiber adapter according to an embodiment of the present invention.
Figure 14:
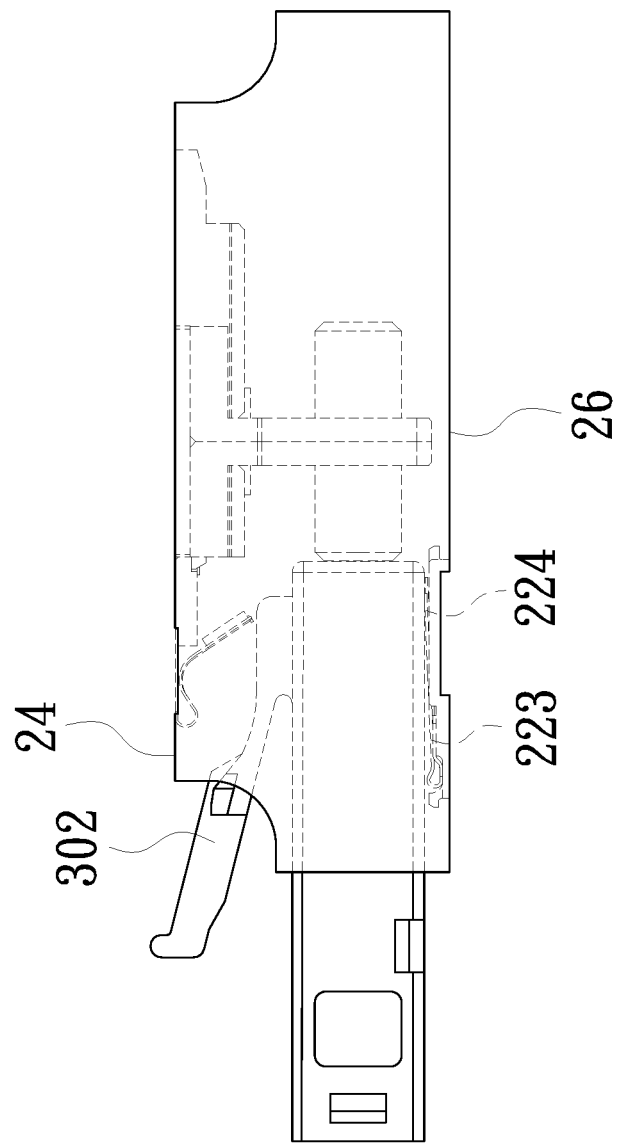
FIG. 14 is a schematic view of an optical fiber connector and an optical fiber adapter completely connected according to an embodiment of the present invention.

As shown in FIG. 10 and FIG. 13, when the optical fiber connector 300 is inserted into the body 12 from the first opening 38, the housing 301 of the optical fiber connector 300 slides in the space defined by the bottom wall upper surface 261 and the axial guiding portion 50 of the body 12, and the front end of the bottom wall of the housing 301 touches the bottom of the first lower sheet 223 and a portion of the lower curved connection portion 222. As the optical fiber connector 300 continues to be pushed in, the first lower sheet 223 and the second lower sheet 224 are actuated toward the fixing seat 16 with the lower curved connection portion 222 as a fulcrum. Then the front end of the top wall of the housing 301 touches the bottom end of the second upper sheet 204. As the optical fiber connector 300 continues to be pushed in, the second upper sheet 204 together with the first upper sheet 203 are actuated toward the upper base 201 with the upper curved connection portion 202 as a fulcrum. When the ferrule 303 of the optical fiber connector 300 and the hollow cylinder 144 of the inner housing 14 of the optical fiber adapter 10 are connected completely, as shown in FIG. 14, the first lower sheet 223 and the second lower sheet 224 are pressed and close to the bottom wall 26 of the body 12, and the first upper sheet 203 and the second upper sheet 204 are located between the latch 302 of the optical fiber connector 300 and the top wall 24 of the body 12.

When the optical fiber connector 300 is pulled out of the body 12, the first upper sheet 203, the second upper sheet 204, the first lower sheet 223 and the second lower sheet 224 are restored to the original positions due to the recovery elastic force. At this time, the optical fiber adapter 10 has the function of shielding.

When the optical fiber connector 300 is inserted into the body 12 and the front end of the bottom wall of the housing 301 of the optical fiber connector 300 touches the bottom of the first lower sheet 223 and a portion of the lower curved connection portion 222, also referring to FIG. 9A, the two opposite ends of the lower curved connection portion 222 are respectively blocked by the two second stoppers 58 located in front of the slot 56 and on the bottom wall upper surface 261, so that the lower curved connection portion 222 and the lower base 221 are not separated from the fixing seat 16 by the excessive friction between the bottom wall of the housing 301 of the optical fiber connector 300 and the lower curved connection portion 222.

When the optical fiber connector 300 continues to be pushed into the body, due to the fact that there are gaps between the two sides of the first upper sheet 203, the second upper sheet 204, the first lower sheet 223 and the second lower sheet 224 and the left side wall 28/the right side wall 30 and the inner surface of the partition wall 32, the first upper sheet 203, the second upper sheet 204, the first lower sheet 223 and the second lower sheet 224 can be actuated smoothly without being stuck by the inner surfaces. When the optical fiber connector 300 is pulled out, the first thickened components 42 are designed to shelter the gaps to close the first opening 38 tightly.

When the optical fiber connector 300 is inserted into the body 12, the ferrule 303 of the optical fiber connector 300 does not contact the second upper sheet 204, the second lower sheet 224 or other components before contacting the inner housing 14, so that the ferrule 303 is not contaminated by other substances such as dust. In addition, since the lower base 221 of the lower movable shutter 22 is placed from the top to the bottom and is engaged to the fixing seat 16, it is not easy to pull the lower base 221 away from the fixing seat 16 as the optical fiber connector 300 is pulled out.

Figure 15:
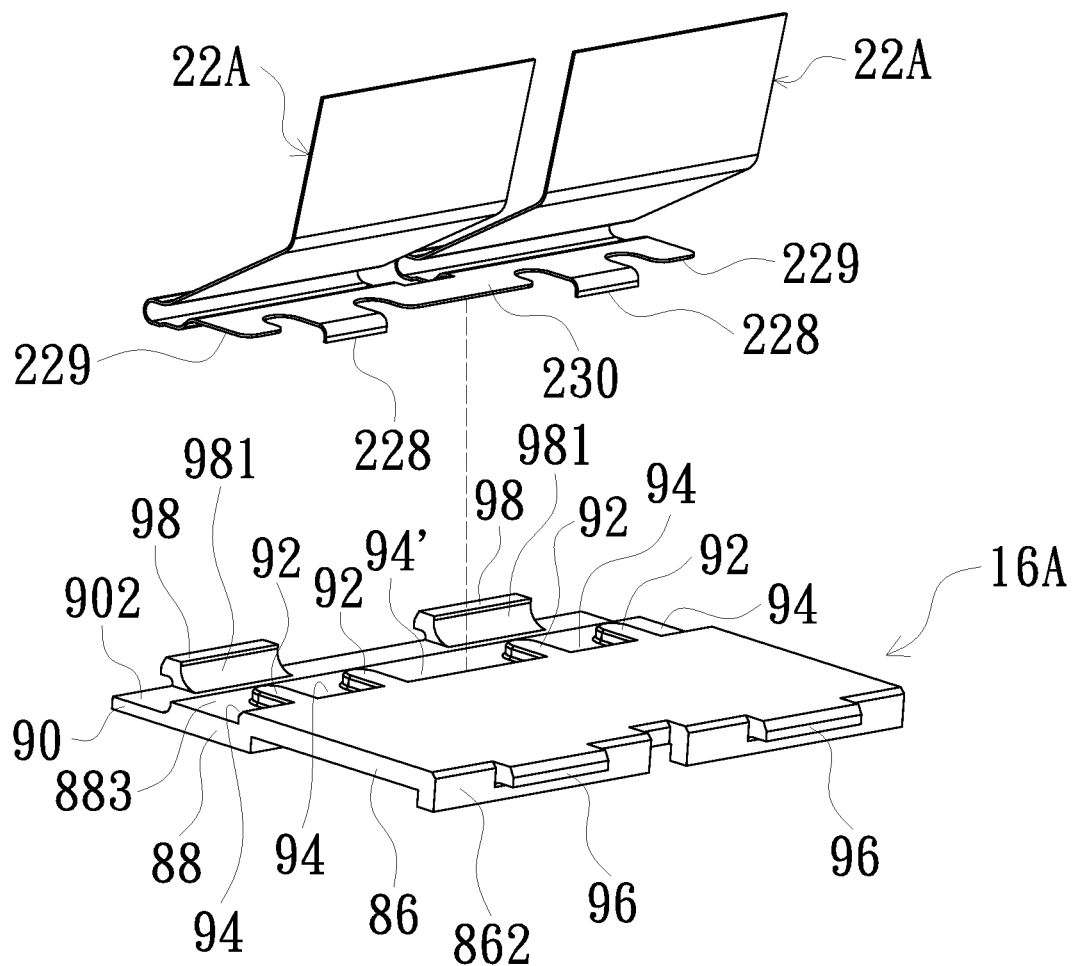
FIG. 15 is a structural schematic view of a fixing seat and a lower movable shutter according to another embodiment of the present invention.

On the other hand, in the above embodiment, the fixing seat 16 is formed by connecting the first fixing seat 80 and the second fixing seat 82 with a connecting section 84, but is not limited hereto. FIG. 15 is a structural schematic view of a fixing seat and a lower movable shutter according to another embodiment of the present invention. As shown in the figure, a fixing seat 16A includes a first platform component 86, a second platform component 88 and a third platform component 90. The structures of the first platform component 86, the second platform component 88 and the third platform component 90 are the same as the structure of the first fixing seat 80. The first front side surface 861 (shown in FIG. 7) of the first platform component 86 extends four bulge components 92 located on the second upper surface 883 of the second platform component 88, and a plurality of placement notches 94, 94' are formed. The first rear side surface 862 is provided with two first fasteners 96. A drop space (unlabeled) is formed between the second upper surface 883 of the second platform component 88 and the third upper surface 902 of the third platform component 90. A leading edge of the third upper surface 902 is provided with two second fasteners 98. A side of the second fastener 98 facing the second platform component 88 forms a curved surface 981.

Figure 16:
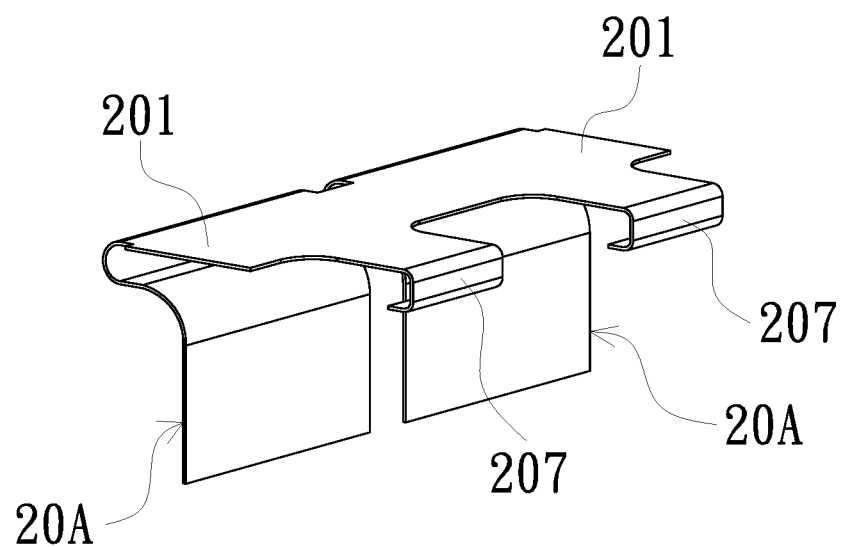
FIG. 16 is a structural schematic view of an upper movable shutter according to another embodiment of the present invention.

Following the above description, corresponding to the fixing seat 16A, lower movable shutters 22A are in groups of two and are connected by a connecting piece 230. When the lower movable shutters 22A are combined with the fixing seat 16A, the fold pieces 228 are inserted in the insert slots 884, and the fixing pieces 229 are fixed in the placement notches 94 respectively, and the connecting piece 230 is fixed in the placement notch 94'. In addition, as shown in FIG. 16, upper movable shutters 20A can also be connected to each other in pairs. When assembled with the body 12, the upper base 201 is fixed to the shutter positioning slot 72 (shown in FIG. 1 and FIG. 2) of the top wall 24, and the curved component 207 at an end of the upper base 201 abuts against the rear wall surface of the shutter positioning slot 72, so that the connected first upper sheet 203 and second upper sheet 204/204' enter the right accommodation room 36/the left accommodation room 34 via the shutter positioning opening 68. The lower movable shutters 22A in groups of two connected to each other, and the upper movable shutters 20A in groups of two connected to each other, have the advantage of reducing production time.

Figure 17:
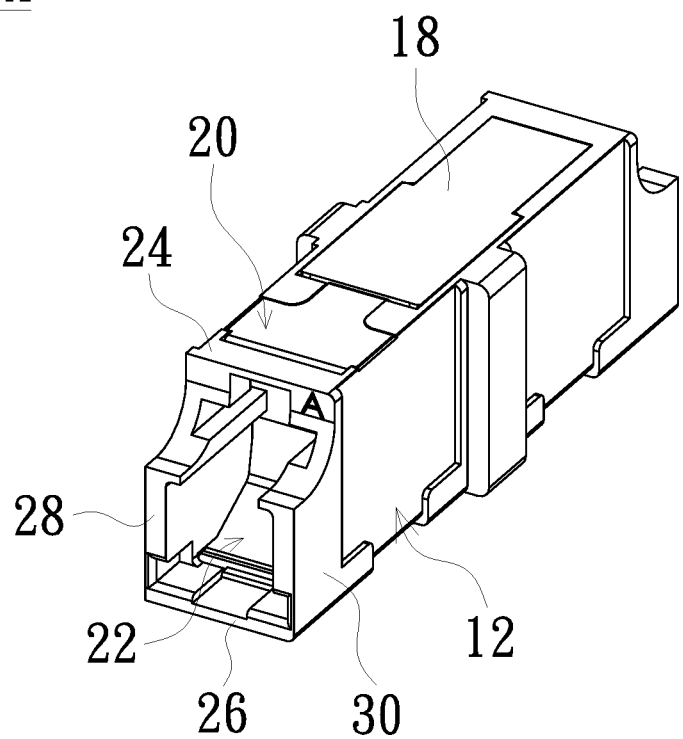
FIG. 17 is a three-dimensional schematic view of an optical fiber adapter according to another embodiment of the present invention.

In the above embodiments, although a duplex optical fiber adapter is used as embodiments of the present invention, those of ordinary skill in the art should also understand that the optical fiber adapter of the present invention can also be a simplex optical fiber adapter 10A as shown in FIG. 17, wherein the partition wall 32 and its corresponding structures are omitted, and the single accommodation room is formed by a top wall 24, a bottom wall 26, a left side wall 28, and a right side wall 30. Other components and structures are the same as the duplex optical fiber adapter, and will not be repeated herein.

According to the above, the optical fiber adapter according to the embodiments of the present invention can be dustproof and water-repellent to increase the service life. The upper movable shutter and the lower movable shutter can shelter the opening tightly to prevent the beam from damaging the eyes, and concurrently can also have the ability to transmit light to observe the light path. In addition, the upper movable shutter and the lower movable shutter are actuated smoothly and are not easy to rub against the surface of the side wall. Moreover, the lower movable shutter and the fixing seat are not easily separated by forced insertion and removal of the optical fiber connector, and therefore have the advantages of good fixation.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical fiber adapter, comprising:
a body, having an axial accommodation room, wherein the axial accommodation room is formed by a top wall, a bottom wall and two opposite side walls, the two opposite side walls are connected to the top wall and the bottom wall, the axial accommodation room is provided with at least one partition wall opposite to the two opposite side walls, the partition wall separates the axial accommodation room into at least two accommodation rooms, two axial ends of each of the accommodation rooms have a first opening and a second opening respectively, the two opposite side walls and two sides of the partition wall have opposite inner surfaces, each of the inner surfaces forms at least a first thickened component adjacent to the first opening, a side surface of the first thickened component forms an axial guiding portion and a first stopper, the first stopper is located above the axial guiding portion, corresponding to the two accommodation rooms, two slots are formed on the bottom wall, the two slots are adjacent to the first opening, and the top wall has an access opening;

an inner housing, comprising two inner housing elements, wherein each of the inner housing elements respectively has two hollow cylinders, the two inner housing elements are fixed in the axial accommodation room, the two hollow cylinders of one of the inner housing elements are located in the two accommodation rooms respectively and are toward the first openings, and the two hollow cylinders of the other inner housing element are located in the two accommodation rooms respectively and are toward the second openings;

a fixing seat, on which at least two insert slots being formed;

two lower movable shutters, wherein each of the lower movable shutters comprises a lower base, a lower curved connection portion and a lower sheet, the lower curved connection portion is connected to the lower base and the lower sheet, the lower base has a fixing structure, the fixing structure of each of the lower movable shutters is combined with one of the insert slots of the fixing seat respectively, the fixing seat covers the two slots, the lower sheet of each of the lower movable shutters is disposed in one of the accommodation rooms, and two opposite side ends of the lower sheet are located at rear sides of the two first thickened components of the accommodation room respectively and shelter a portion of the first opening;

two upper movable shutters, disposed in one of the accommodation rooms respectively, wherein two opposite side ends of each of the upper movable shutters are partially located at rear sides of the two first thickened components of the accommodation room respectively and abut against the axial guiding portion and the first stopper, and a portion of the upper movable shutter and a portion of the lower sheet are in overlapping and separable contact to shelter the first openings; and a cover, covering the access opening.

2. The optical fiber adapter according to claim 1, wherein the top wall further has two shutter positioning openings and a shutter positioning slot, the two shutter positioning openings are adjacent to the first opening and correspond to the two accommodation rooms respectively, and the shutter positioning slot is located between the two shutter positioning openings and the access opening.

3. The optical fiber adapter according to claim 2, wherein each of the upper movable shutters comprises an upper base, an upper curved connection portion and an upper sheet, the upper curved connection portion is connected to the upper base and the upper sheet, the two upper bases of the two upper movable shutters are combined with the shutter positioning slot on the top wall of the body and cover the two shutter positioning openings, the two upper sheets of the two upper movable shutters are disposed in one of the accommodation rooms respectively, two opposite side ends of the upper sheet are located at rear sides of the two first thickened components of the accommodation room respectively and abut against the axial guiding portion and the first stopper, and a portion of the upper sheet is in contact with the lower sheet.

4. The optical fiber adapter according to claim 1, wherein each of the inner surfaces further forms a second thickened component and a third thickened component, the third thickened component is adjacent to the second opening, the second thickened component is located between the first thickened component and the third thickened component, an actuating space of the upper sheet and the lower sheet in the accommodation room is defined between the first thickened components and the second thickened components, a setting space of the two inner housing elements in the axial accommodation room is defined between the second thickened components and the third thickened components.

5. The optical fiber adapter according to claim 4, wherein the setting space defined between the second thickened components and the third thickened components is an elongated notch.

6. The optical fiber adapter according to claim 3, wherein a profile of a rear side surface of the first thickened component corresponds to a profile where the upper sheet and the lower sheet are in partially overlapping contact.

7. The optical fiber adapter according to claim 3, further comprising a light-transmitting stopper, wherein a visible opening is defined between the first stopper and the axial guiding portion, the upper sheet of the upper movable shutter comprises a first upper sheet and a second upper sheet, the first upper sheet is located between the upper curved connection portion and the second upper sheet, a width of the second upper sheet is smaller than a width of the first upper sheet to reveal the visible opening, the light-transmitting stopper covers the second upper sheet, and a portion of the light-transmitting stopper shelters the visible opening.

8. The optical fiber adapter according to claim 1, wherein the two opposite side walls and a bottom of the partition wall of the body form opposite positioning notches, the fixing seat comprises a first platform component, a second platform component and a third platform component, the first platform component is connected to the second platform component, a second front side surface of the second platform component is connected to the third platform component, a drop space is formed between the second platform component and the third platform component, the insert slots are disposed on the second platform component, and two opposite side ends of the first platform component of the fixing seat are engaged in the two positioning notches of the body respectively.

9. The optical fiber adapter according to claim 8, wherein each of the slots has a front inner wall and a rear inner wall opposite to each other, corresponding to the two accommodation rooms, two first notches and two second notches are formed on the bottom wall of the body, each of the first notches is extended to the slot from the first opening, each of the second notches penetrates a portion of the rear inner wall of the slot, corresponding to the two accommodation rooms, a first rear side surface of the first platform component is provided with two first fasteners, a leading edge of the third platform component is provided with two second fasteners, the first rear side surface of the first platform component abuts against the rear inner wall of the slot and the two first fasteners are engaged in the two second notches respectively, and a third front side surface of the third platform component abuts against the front inner wall of the slot and the two second fasteners are engaged in the first notches respectively.

10. The optical fiber adapter according to claim 8, wherein a bottom edge of a first front side surface of the first platform component is connected to a top edge of a second rear side surface of the second platform component, the first front side surface of the first platform component extends at least two bulge components located on the second platform component to form a plurality of placement notches, and the insert slots are located in the placement notches.

11. The optical fiber adapter according to claim 8, wherein the lower base of each of the lower movable shutters comprises a step structure and the fixing structure, the fixing structure comprises at least one fold piece, the step structure is disposed in the drop space of the fixing seat, and the fold piece is inserted in one of the insert slots.

12. The optical fiber adapter according to claim 9, wherein a side of each of the second fasteners facing the second front side surface forms a curved surface, and a second convex surface of the lower curved connection portion of each of the lower movable shutters abuts against the curved surface.

13. The optical fiber adapter according to claim 1, wherein the two lower bases of the two lower movable shutters are connected by a connecting piece.

14. The optical fiber adapter according to claim 3, wherein an end of the upper base of each of the upper movable shutters has a curved component abutting against a rear wall surface of the shutter positioning slot.

15. The optical fiber adapter according to claim 3, wherein the two upper bases of the two upper movable shutters are connected together.

16. The optical fiber adapter according to claim 1, wherein two opposite sides of each of the inner housing elements respectively have a convex component and a concave component, and the convex component of one of the inner housing elements is combined with the concave component of the other inner housing element so that the two inner housing elements are engaged to each other.

17. The optical fiber adapter according to claim 1, wherein a top edge of each of the inner housing elements is respectively provided with a plurality of housing fasteners, and the housing fasteners and the hollow cylinders of the inner housing element are toward the same direction.

18. The optical fiber adapter according to claim 17, wherein a plurality of longitudinal meshing components and a plurality of lateral fasteners are formed on a surface of the cover facing the access opening, the longitudinal meshing components have a disconnection notch to engage the two inner housing elements, the housing fasteners of the two inner housing elements are engaged to the longitudinal meshing components respectively, and the lateral fasteners are adjacent to the disconnection notch and clamp top edges of the two inner housing elements.

19. The optical fiber adapter according to claim 1, wherein at least one second stopper is disposed on the bottom wall in front of each of the slots.

* * * * *